United States Patent [19]

Chang et al.

[11] Patent Number: 5,018,859

[45] Date of Patent: May 28, 1991

[54] FIBER OPTIC GYROSCOPE BALANCED PLURAL SERRODYNE MODULATORS PHASE DIFFERENCE CONTROL

[75] Inventors: Chin L. Chang; Rudolf C. Dankwort, both of Phoenix, Ariz.

[73] Assignee: Honeywell Inc., Minneapolis, Minn.

[21] Appl. No.: 302,484

[22] Filed: Jan. 26, 1989

[51] Int. Cl.⁵ ............................................. G01B 9/02
[52] U.S. Cl. ................................................... 356/350
[58] Field of Search ........................................ 356/350

[56] References Cited

U.S. PATENT DOCUMENTS 4,728,192  3/1988  Shaw et al. ......................... 356/350
4,834,538  5/1989  Heeks et al. ........................ 356/350

FOREIGN PATENT DOCUMENTS 3104786  2/1982  Fed. Rep. of Germany ...... 356/350

OTHER PUBLICATIONS

Progress in Optical Fiber Gyroscopes Using Integrated Optics, LeFevre et al., 1986.
"Fiber Gyroscope with Phase-Modulated Single-Sideband Detection", D. Eberhard et al., *Optics Letters*, vol. 9, No. 1, 1/1984, pp. 22–24.
"Gated Phase-Modulation Approach to Fiber-Optic Gyroscope with Linearized Scale Factor", B. Kim et al., *Optics Letters*, vol. 9, No. 8, 8/1984, pp. 375–377.
"Closed-Loop Fiber-Optic Gyroscope with a Sawtooth Phase-Modulated Feedback", A. Ebberg et al., *Optics Letters*, vol. 10, No. 6, 6/1985, pp. 300–302.
"Fiber-Optic Gyroscopes", B. Kim et al., *IEEE Spectrum*, 3/1986, pp. 54–60.

Primary Examiner—Samuel Turner
Attorney, Agent, or Firm—Kinney & Lange

[57] ABSTRACT

A phase difference controller for a rotation sensor based on a coiled optical fiber operating a dual output generator in a feedback loop to provide a pair of signals to operate a pair of frequency translating devices in the optical path with the coil. A pair of sawtooth-like signals of appropriate frequency and polarity operate the frequency translating device to provide a phase difference shift in the optical path.

23 Claims, 3 Drawing Sheets

FIBER OPTIC GYROSCOPE BALANCED PLURAL SERRODYNE MODULATORS PHASE DIFFERENCE CONTROL

BACKGROUND OF THE INVENTION

The present invention relates to fiber optic gyroscopes used for rotation sensing and, more particularly, to fiber optic gyroscopes operated in a feedback loop.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential of becoming economical in cost. They can also be sensitive to low rotation rates that can be a problem in other kinds of optical gyroscopes.

A fiber optic gyroscope has a coil of optical fiber wound on a core and about the axis thereof around which rotation is to be sensed. The optical fiber is typically of a length of 1,000 to 2,000 meters, or so, and is part of a closed optical path in which an electromagnetic wave, or light wave, is introduced and split into a pair of such waves, to propagate in opposite directions through the coil to both ultimately impinge on a photodetector. Rotation about the sensing axis of the core, or of the coiled optical fiber, provides an effective optical path length increase in one rotational direction and an optical path length decrease in the other rotational direction for one of these waves. The opposite result occurs for rotation in the other directions. Such path length differences between the waves introduce a phase shift between these waves for either rotation direction, i.e. the well known Sagnac effect. The use of a coiled optical fiber is desirable because the amount of phase difference shift due to rotation, and so the output signal, depends on the length of the entire optical path through the coil traversed by the two opposing directional electromagnetic waves, and so a large phase difference shift can be obtained in the long optical fiber but in the relatively small volume taken by it in being coiled.

The output current from the photodetector system photodiode in response to the opposite direction traveling electro magnetic waves impinging thereon, after passing through the coiled optical fiber, follows a cosine function. That is, the output current depends on the cosine of the phase difference between these two waves. Since a cosine function is an even function, such an output function gives no indication as to the relative direction of the phase difference shift, and so no indication as to the direction of the rotation about the axis. In addition, the rate of change of a cosine function near zero is very small, and so such an output function provides very low sensitivity for low rotation rates.

Because of these unsatisfactory characteristics, the phase difference between the two electromagnetic waves is usually modulated by placing an optical phase modulator on one side of the coiled optical fiber. As a result, one of the opposite direction propagating waves passes through the modulator on the way into the coil, while the other wave transversing the coil in the opposite direction, passes through the modulator upon exiting the coil. In addition, a phase sensitive demodulator is provided to receive the photodetector output current. Both the optical phase modulator and the phase sensitive demodulator are typically operated by a sinusoidal signal generator at the so-called "proper" frequency, but other waveform types of the same fundamental frequency can be used. Other frequencies can also be used.

This "proper" frequency is selected to be that frequency which results in the modulating of one of the waves 180° out of phase with the modulation of the other. This modulation providing 180° of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and can provide the maximum rate of change of signal value as a function of rotation rate near a zero rotation rate, i.e. has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator are a substantial improvement over the characteristics of the output current of the photodetector.

Nevertheless, the phase sensitive demodulator output, in following a sine function, results in an output that at rotation rates further from zero, is less and less linear. For rotation rates of an amplitude sufficient to be past one of the peaks of the sine function, the output response value because of being periodic will be ambiguous with respect to just which rotation rate is occurring. Thus, there is a strong desire to operate the gyroscope so that the output signal of the phase sensitive demodulator stays within the linear region near the zero rotation rate value.

This can be accomplished by adding a further phase modulator, or frequency shifter, near the coil in an optical path portion used by the opposite direction traveling electromagnetic waves propagating through the coiled optical fiber to reach the photodetector. This phase modulator, or frequency shifter, is operated in a feedback loop from the photodetector system, and provides sufficient negative feedback such that the phase modulator introduced phase change is just enough to cancel the phase shift difference between the opposite traveling direction electromagnetic waves resulting from a rotation about the axis of the coiled optical fiber. As a result, there will be little phase shift difference occurring at the photodetector except for transient rotation rate changes, and so little phase shift sensed by the phase sensitive demodulator. Thus, the output signal of this phase sensitive demodulator will always be near to, or at, zero. The signal from a generator connected to the phase sensitive demodulator for operating this additional phase modulator, through providing a signal directing the modulator to provide a particular phase shift sufficient to cancel the phase shift due to rotation, will thus contain within it or a related signal the information as to the magnitude and direction of the rotation rate.

Several forms for the output signal from the generator connected to the phase sensitive demodulator in the feedback loop have been suggested for operating this additional optical phase modulator. One common and good choice is to use a serrodyne generator which applies a sawtooth-like signal to the optical phase modulator. A sawtooth or sawtooth-like signal is chosen because it can be shown that a sawtooth signal provides what amounts to a pure frequency translation for the modulated electromagnetic waves, a single-sideband modulator. As a result, light passing through the phase modulator being operated with such a sawtooth signal will leave the modulator with its frequency translated by an amount equal to the frequency of the sawtooth signal. A sawtooth-like signal won't result in pure frequency translation, there instead will be added harmonics generated which can be kept small by providing very nearly a sawtooth waveform and by good design of the modulator.

Since the optical phase modulator so operated will be on one side of the coiled optical fiber, one of the electromagnetic waves will have its frequency translated upon entering the coil while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at the photodetector in an amount set by the frequency of the sawtooth and the nature of the fiber of $2\pi\tau\Delta f$. Here, $\Delta f$ is the modulator or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

However, low rotation rates pose a problem. The lower the rotation rate, the lower the frequency of the sawtooth waveform must be and so the long duration substantially increasing or decreasing amplitude portion of the waveform, or ramp portion, (as opposed to the substantially decreasing or increasing, respectively, "flyback" portion of the waveform) gets very long. This situation results in a waveform which becomes difficult to generate in electronic circuitry. In addition, the gyroscope in these circumstances has a very limited ability in tracking changes in the rotation rate which can occur during the long increasing or decreasing portions of the sawtooth waveform. Such problems will result in slow responses to rotation rate changes, and in a nonlinear or inaccurate scale factor relating the rotation rate to the output signal, a scale factor which is desired to be linear. Thus, there is a strong desire to provide a fiber optic gyroscope which can operate in the linear range of the output signal of the phase sensitive demodulator but which can provide an accurate response to low rotation rates and be able to indicate quickly changes in such rates.

SUMMARY OF THE INVENTION

The present invention provides a phase difference controller for a rotation sensor based on a coiled optical fiber having opposite direction electromagnetic waves propagating therethrough to reach a photodetector after passing through a pair of frequency translating devices operated in a feedback loop. A phase detector connected to the photodetector provides an indication of relative phase differences between the electromagnetic waves impinging on the photodetector, and operates a dual output generator which provides a pair of output signals, one to operate each of the frequency translating devices. The detector, providing a signal indicative of phase differences between the opposite direction propagating electromagnetic waves, and the direction of the difference, permits the generator to provide a pair of sawtooth-like signals of appropriate frequency and polarity to operate the frequency translating devices to provide a phase difference shift in the electromagnetic waves which tends to cancel the phase difference shift therebetween due to rotation about the axis of the fiber optic coil. The generator may have an integrating device therein to store representations of loop errors to thereby permit zero loop errors in the steady state.

DETAILED DESCRIPTION OF THE PREFERRED EMBODIMENTS

Figure 1:
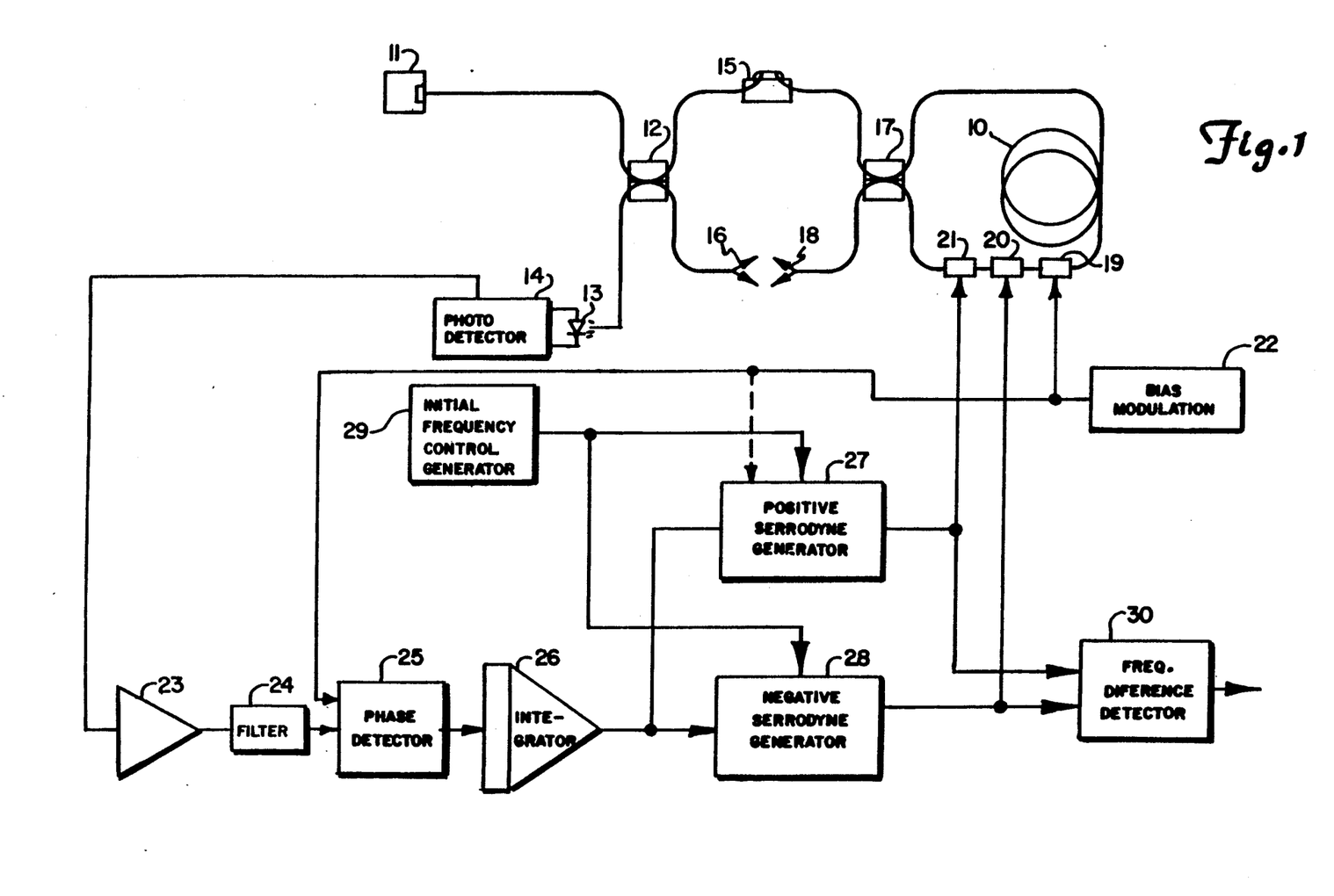
FIG. 1 shows an embodiment of the present invention in diagrammatic form.

FIG. 1 shows a system diagram of a fiber optic gyroscope system using a feedback loop to control dual serrodyne phase modulation of opposite direction traveling electromagnetic waves in a coiled optical fiber. The system can operate well at low rotation rates about the axis of that optical fiber coil. Further, the system can respond quickly to rotation rate changes at such low rotation rates.

The optical portion of the system contains several features along the optical paths to assure that the system is reciprocal, i.e. that substantially identical optical paths occur for each of the opposite direction propagating electromagnetic waves except for the introductions of non-reciprocal phase difference shifts as will be described below. The coiled optical fiber forms a coil, 10, about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity as well as the introduction of non-reciprocal phase shifts as is indicated to be done below.

In addition, the optical fiber is a so-called polarization-maintaining fiber in that a very significant birefringence is constructed in the fiber so that birefringence introduced by mechanical stress or shortcomings in polarizers, which are unavoidable, and by the Faraday effect in magnetic fields, or from other sources, and which can lead to randomly varying phase difference shifts, become relatively insignificant. Thus, either the high refractive index axis, i.e., the slower propagation axis, or the low index axis is chosen for propagating the electromagnetic waves depending on the other optical components in the system. In the present system, the slow axis has been chosen in view of the optical components used therein.

The coil is wound on a spool using the "quadripole" technique so that similarly located points in the coil are near one another. This reduces the effects of time-varying phenomena such as thermal gradients, from affecting opposite direction propagating electromagnetic waves differently from one another. A typical length of the optical fiber about the spool within the coil would be on the order of 2,000 m.

The electromagnetic waves which propagate in opposite directions through coil 10 are provided from an electromagnetic wave source, or light source, 11, in FIG. 1. This source is typically a laser diode which provides electromagnetic waves, typically in the near-infrared part of the spectrum, of a typical wavelength of 830 nm. Source 11 must have a short coherence length for emitted light to reduce the phase shift difference errors between these waves due to Rayleigh and Fresnel scattering at scattering sites in coil 10. Because of the non-linear Kerr effect in coil 10, different intensities in the two counter propagating waves can lead to phase difference shifts therebetween. This situation can be overcome also by use of a short coherence length source for source 11 which leads to modal phase shift cancellings.

Between laser diode 11 and fiber optic coil 10 there is shown an optical path arrangement in FIG. 1 formed by an extension of the ends of the optical fiber forming coil 10 to some optical coupling components which separate the overall optical path into several optical path portions. A portion of the same kind of polarization-maintaining optical fiber as in coil 10 is positioned against laser diode 11 at a point of optimum light emission therefrom, a point from which it extends to a first optical directional coupler, 12.

Optical directional coupler 12 has light transmission media therein which extend between four ports, two on each end of that media and which are provided on each end of coupler 12 in FIG. 1. One of these ports has the optical fiber extending from laser diode 11 positioned thereagainst. At the other port on the same end of the optical directional coupler 12 there is shown a further optical fiber positioned thereagainst which extends to be positioned against a photodiode, 13, which is electrically connected to a photodetection system, 14.

Photodiode 13 detects electromagnetic waves, or light waves, impinging thereon from the portion of the optical fiber positioned thereagainst and provides a photocurrent in response. This photo current, as indicated above, in the case of two nearly coherent light waves impinging thereon follows a cosine function in providing a photocurrent output which depends on the cosine of the phase difference between such a pair of light waves. This photovoltaic device will operate into a very low impedance to provide the photocurrent which is a linear function of the impinging radiation, and may typically be a p-i-n photodiode.

Optical directional coupler 12 has another optical fiber against a port at the other end thereof which extends to a polarizer, 15. At the other port on that same side of coupler 12 there is a non-reflective termination arrangement, 16, involving another portion of an optical fiber.

Directional optical coupler 12, in receiving electromagnetic waves, or light, at any port thereof, transmits such light so that approximately half thereof appears at each of the two ports of coupler 12 on the end thereof opposite that end having the incoming port. On the other hand, no light is transmitted to the port which is on the same end of coupler 12 as is the incoming light port.

Polarizer 15 is used because, even in a single mode fiber, two polarization modes are possible in light passing through the fiber. Thus, polarizer 15 is provided for the purpose of passing one of these polarization modes through the optical fiber, along the slow axis thereof as indicated above, while blocking the other. Polarizer 15, however, does not entirely block light in the one state of polarization that it is intended to block. Again, this leads to a small non-reciprocity between two opposite direction traveling waves and so a small non-reciprocal phase difference between them which can vary with the conditions of the environment in which the polarizer is placed. In this regard, the high birefringence in the optical fiber used again aids in reducing this resulting phase difference as indicated above.

Polarizer 15 has a port on either end thereof with light transmission media contained therein positioned therebetween. Positioned against the port on the end thereof opposite that connected to optical directional coupler 12 is another optical fiber portion which extends to a further optical bidirectional coupler, 17, which has the same light transmission properties as does coupler 12.

The port on the same end of coupler 17 from which a port is coupled to polarizer 15 again is connected in a non-reflective termination arrangement, 18, using a further optical fiber portion. Considering the ports on the other end of coupler 17, one is connected to further optical components in the optical path portions extending thereto 17 from one end of the optical fiber in coil 10. The other port on coupler 17 is directly coupled to the remaining end of optical fiber 10.

Between coil 10 and coupler 17, on the side of coil 10 opposite the directly connected side thereof, are provided three optical phase modulators, 19, 20, and 21. Each of these optical phase modulators has two ports on either end of transmission media contained therein which occur in FIG. 1 on the opposite ends of each of the modulators. The optical fiber from coil 10 is positioned against a port of modulator 19. The optical fiber extending from coupler 17 is positioned against a port of modulator 21. Optical fiber portions are shown between modulators 20 and 21 positioned against one port of each, and a further optical fiber portion is shown between modulators 19 and 20 positioned against one port of each to thereby complete the optical path from coil 10 to coupler 17 on that side. In some forms of optical integrated circuits, a pair of these modulators or all three of them could alternatively be provided in a common optical integrated circuit thereby avoiding the use of optical fiber portions between pairs thereof for purposes of completing the optical path.

Each of modulators 19, 20, and 21 are capable of receiving electrical signals to cause them to introduce a phase difference in light transmitted therethrough by changing the index of refraction of the transmission medium or transmission media therein to thereby change the optical path length. Optical phase modulators constructed in optical integrated circuit form have a large bandwidth, i.e. are able to provide phase changes with a waveform that has substantial high frequency content.

This completes the description of the optical portion of the system of FIG. 1 formed along the optical path followed by the electromagnetic waves, or light waves, emitted by source 11. Such light is coupled from that source through the optical fiber portion to optical directional coupler 12. Some of that light entering coupler 12 from source 11 is lost in non-reflective terminating arrangement 16 coupled to a port on the opposite end thereof, but the rest of that light is transmitted through polarizer 15 to optical directional coupler 17.

Coupler 17 serves as a beam-splitting apparatus in that the light entering the port thereof, received from polarizer 15, splits in approximately half with one portion thereof passing out of each of the two ports on the opposite end thereof. Out of one port on that opposite end of coupler 17, a light wave passes through optical fiber coil 10, through modulators 19, 20, and 21, and back to coupler 17. There, a portion of this returning light is lost in non-reflective arrangement 18 connected to the other port on the polarizer 15 connection end of coupler 17, but the rest of that light passes through the other port of coupler 17 to polarizer 15 and to coupler 12 where a portion of it is transmitted to photodiode 13. The other part of the light passed from polarizer 15 to coil 10 leaves the other port on the coil 10 end of coupler 17, passes through modulators 21, 20, and 19, and optical fiber coil 10 to reenter coupler 17 and, again, with a portion thereof following the same path as the other portion to finally impinge on photodiode 13.

As indicated above, photodiode 13 provides an output photocurrent proportional to the intensity of the two electromagnetic or light waves impinging thereon, and which follows a cosine function in being based on the cosine of the phase difference between these two waves at impingement on that diode. This is because the current depends on the resulting optical intensity of the two waves incident on photodiode 13 which intensity will vary depending on how much constructive or destructive interference occurs between the two waves. This interference of waves will change with rotation of the coiled optical fiber forming coil 10 about its axis as such rotation introduces a phase difference shift between the waves. Further, additional phase difference shifts can be introduced by phase modulators 19, 20, and 21 as will be described in connection with the electrical system shown in the remainder of FIG. 1.

The electrical system portion of FIG. 1 forms a feedback loop from photodetector system 14, including photodiode 13, to the optical path as it passes through optical phase modulators 20 and 21. Optical phase modulator 19 is of the kind described above and is used in conjunction with a phase sensitive demodulator, or phase detector, for converting the output signal of photodetector system 14, following a cosine function, to a signal following a sine function. Following such a sine function provides, in that output signal, information both as to rate of rotation and as to the direction of that rotation about the axis of coil 10. Modulator 19 is driven by a bias modulation signal generator, 22, which also provides a signal to drive a phase detector which, as indicated, is a phase sensitive demodulator.

Thus, the output signal from photodetector system 14, including photodiode 13, is provided to an amplifier, 23, where it is amplified and passed through a filter, 24, to such a phase detector, 25. The phase sensitive demodulator serving as phase detector 25 is a well known device. Such a phase sensitive demodulator senses changes in the first harmonic, or fundamental frequency, of generator 22 to provide an indication of the relative phase of light waves impinging on photodetector 13. This information is presented by phase detector 25 in an output signal following a sine function in that this output signal follows the sine of the phase difference between the two light waves impinging on photodiode 13.

Bias modulator signal generator 22, in modulating the light in the optical path at the "proper" frequency described above, also generates a strong second harmonic component in photodetector system 14. Filter 24 is a notch filter for removing this second harmonic component.

In operation, the phase difference changes in the two opposite direction propagating waves passing through coil 10 in the optical path, which will be described below, due to modulators 20 and 21 will lead to net phase difference changes between the waves which will be very small, and which will vary relatively slowly compared with the phase difference changes due to modulator 19. Any phase difference shift due to modulators 20 and 21, or to the Sagnac effect, will merely shift the phase difference between the light waves with an amplitude scaling factor for the sine of this phase difference being set by the modulation of the waves due to modulator 19 at demodulation. Synchronous demodulation will thus remove the effects of the sinusoidal modulation due to generator 22 and modulator 19.

Of course, the use of negative feedback in the feedback system of the kind shown in FIG. 1 in the electrical system portion will lead to there being a zero net phase difference between the light waves for constant rotation rates aside from the phase difference therebetween due to modulator 19 and generator 22. Since any net phase difference outside the bias modulator phase difference represents an error signal in this feedback system, this is the same as stating that the steady state errors are driven to zero which will require the feedback loop to follow an integral control law. Hence, the only net phase differences which will occur in the light waves impinging on photodiode 13, outside the bias modulator caused phase difference will be those occurring during transient situations represented by changes in rotation rates.

Thus, the steady state errors, or phase differences between the light waves impinging on photodiode 13 due to rotation, are forced to be zero in the steady state of a constant rotation rate about the axis of coil 10, through the presence of an integrator, 26, in this feedback loop. Integrator 26 stores all error signal excursions at the output of phase detector 25 and provides a countering output signal based on the time integral of those errors. This integrator 26 output signal causes a sufficient phase shift in the optical path through modulators 20 and 21 to provide zero error, or zero phase difference, aside from the bias modulation phase difference, in the steady state resulting from a constant rotation rate.

The output signal of integrator 26 is applied to the inputs of a positive serrodyne generator, 27, and a negative serrodyne generator, 28. Generators 27 and 28 are operated at identical initial frequencies of, typically, 75.0 kHz which are set by output signals from an initial frequency control generator, 29. At this frequency, positive generator 27 has at its output a sawtooth voltage wave having positive peaks, or at least a sawtooth-like voltage wave with a basic waveform portion having a relatively long duration of substantially increasing voltage followed by a very short duration of substantially decreasing voltage. Similarly, negative generator 28 has at its output a sawtooth, or sawtooth-like, voltage waveform but one having negative voltage peaks.

The voltage of each of these waveforms from positive and negative generators 27 and 28 are applied to optical phase modulators 21 and 20, respectively. The design of modulators 21 and 20 and the value of the peak voltages in the output signal waveforms provided by the respective serrodyne generator connected thereto are chosen so at the peak each modulator provides a phase shift of $2\pi$ radians. This choice of peak phase shift can be shown to lead to a nearly pure frequency translation arrangement involving the modulator and its serrodyne generator. That is, as indicated above, the modulation of either generator results in an effective single-sideband modulation result, shifting the frequency of the light wave passing through the modulator in an amount equal to the frequency of the signal operating the modulator.

Deviations from an ideal sawtooth wave show up as harmonics which increase more or less with the amount of deviation. However, modulators 20 and 21 can be driven by either generator to provide very nearly an ideal sawtooth variance in the phase of the light waves passing therethrough so that relatively little harmonic content is present. Thus, this $2\pi$ radian peak phase difference is maintained by modulators 20 and 21 and the corresponding serrodyne generators whatever the frequency of the sawtooth waveforms provided thereby and, hence, the effect of the output signal of integrator 26 is to shift the frequencies of the light waves passing through the modulators by the frequency at which generators 27 and 28 operate with respect to the initial frequencies thereof.

In the absence of an output signal from integrator 26, because of a maintained sensor zero rotation rate, the first light wave entering modulator 21 before reaching coil 10 will be shifted upward by the initial frequency, or 75.0 kHz, but traveling on to modulator 20 will be shifted downward by the initial frequency so that no net frequency translation occurs for that light wave. On the other hand, a second light wave exiting coil 10 and entering modulator 20 will also be downward shifted by the value of the initial frequency, again 75.0 kHz, but then upward shifted by the value of the frequency in modulator 21 so that again no frequency translation takes place for this second and opposite direction propagating light wave. Note that the initial frequencies are substantial frequencies so that no low frequency, long ramp portion sawtooth-like wave forms need be generated at rotation rates near zero. Rather, such rates lead to small frequency differences between the output signals of generators 27 and 28, but these differences occur about the initial frequency set by generator 29. Thus, each of generators 27 and 28 operates near its initial frequency for low rotation rates, a frequency which electronic circuitry has no difficulty generating.

If, on the other hand, a change in a rotation rate about the axis of coil 10 occurs, there will be a Sagnac effect phase shift between these two opposite direction propagating light waves. (This phase difference will have a value of $2\pi LD\Omega/\lambda c$ where L is the length of the fiber, D is the diameter of the coil, $\Omega$ is the angular rotation rate, $\lambda$ is the wavelength of source 11 and c is the speed of light in free space.) Such a phase shift will cause an initial output from phase detector 25 which will be integrated by integrator 26. The output of integrator 26 will change accordingly causing a change in the frequencies of positive serrodyne generator 27 and negative serrodyne generator 28.

If the rotation rate is in a positive angular direction, the output of integrator 26 will be positive causing the frequency of positive serrodyne generator 27 to increase and the frequency of negative serrodyne generator 28 to decrease. For rotation in the opposite direction, the output of integrator 26 will become negative causing an opposite result in the frequencies of serrodyne generators 27 and 28. In either event, there will be a net frequency upshift in the first instance, and a net frequency downshift in the second instance. These changes in generator frequency can occur quite quickly, even for changes at low rotation rates, so that the gyroscope output signal, based on the net frequency difference between generator signals, changes quickly for changes in rotation rate at any rotation rate level.

As a result, the first light wave entering coil 10 after passing through modulator 21 and 20 will be at a higher frequency or lower frequency in coil 10 than the second light wave entering coil 10 through the opposite end thereof. The result of the two light waves traveling through coil 10 at two different frequencies will leave a net phase difference shift between the light waves, a positive relative phase difference shift between the light waves in the first instance and a negative net phase difference shift in the second instance. The phase difference shifts generated will come to be just enough to cancel the Sagnac effect phase difference shift if the rotation rate remains steady through being a phase difference shift in the opposite direction.

Figures 2A, 2B, 3:
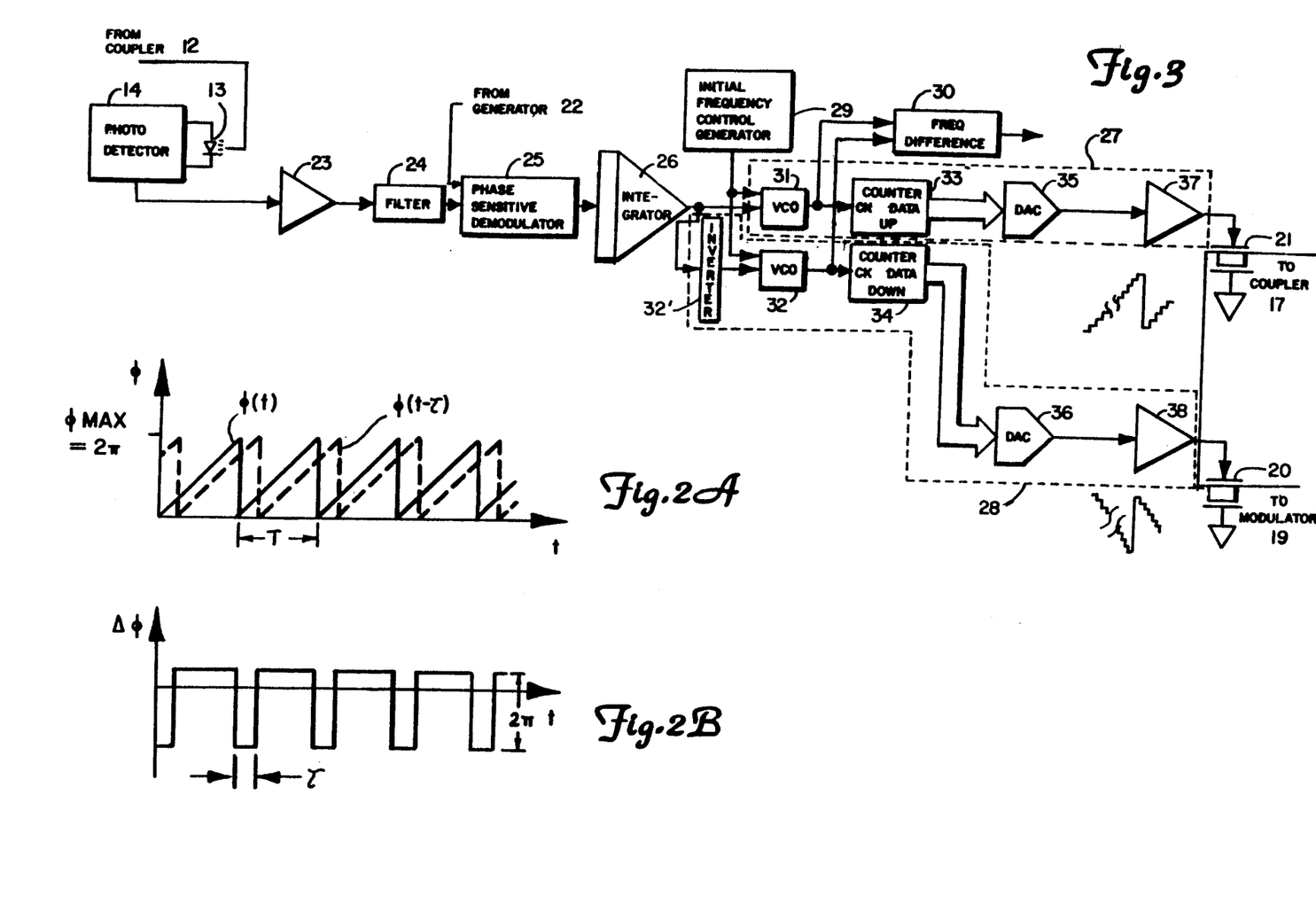
FIGS. 2A and 2B show waveforms involved in the present invention.
FIG. 3 shows further aspects of a portion of the invention shown in FIG. 1.

A plot of the effective phase shift applied to the light beams by either of the phase modulators 21 or 22 (without showing the phase difference shifting due to modulator 19) is shown at a selected frequency arbitrarily shown to be equal to 1/T in FIG. 2A. As can be seen there, the phase shift peak is $2\pi$ radians for each of the light waves as indicated above. Also, the dashed line representing the second light wave passing through coil 10 before reaching the modulator can be seen to be delayed by the transit time for the light wave through coil 10 which is $\tau$ as indicated above.

As a result, as can be see in FIG. 2B, there is a net phase difference shift maintained between the two light waves by either modulator as they impinge on photodiode 13 which is positive for most of the time in the example selected here but which takes a value of $2\pi$ radians less than the positive value periodically. The net phase difference shift for either modulator can be considered as a constant phase shift equal to $2\pi\tau\Delta f$ where $\Delta f$ is, as before, the serrodyne waveform fundamental frequency for that generator. The periodic nature of the output response of photodiode 13 leads to having both the positive values and the negative values of FIG. 2B, being $2\pi$ radians apart, yield the same photocurrent output to give an instant output signal representing the phase shift at each modulator and so a constant difference. The net of the phase difference shifts of each of the modulators 20 and 21 are effectively combined algebraically, and, forced by the feedback loop to equal the Sagnac effect phase shift due to rotation about the axis of coil 10.

The two serrodyne generators in FIG. 1 each operate a corresponding one of modulator 20 and 21 through being driven by the output signal of integrator 26. However, one of serrodyne generators 27 and 28 could be operated by integrator 26 and the other kept at its initial frequency. The one operated by integrator 26 would shift from its initial frequency but with greater excursions.

Optical phase modulators 20 and 21, and bias modulator 19, are shown as being on one side of coiled optical fiber 10. This is convenient since both modulators 20 and 21, or all of modulators 20, 21 and 19, can be provided in a single LiNbO$_3$ substrate, or optical integrated circuit as indicated above. Particular advantage is obtained in placing modulators 20 and 21 on a single substrate to thereby maintain an accurate and substantially constant separation from one another along the optical path, despite changing temperatures, to thereby reduce system drift, and further to reduce the number of optical fiber-optical component interfaces to thereby lessen electromagnetic wave attenuation. A single substrate also serves to reduce size.

Figure 4:
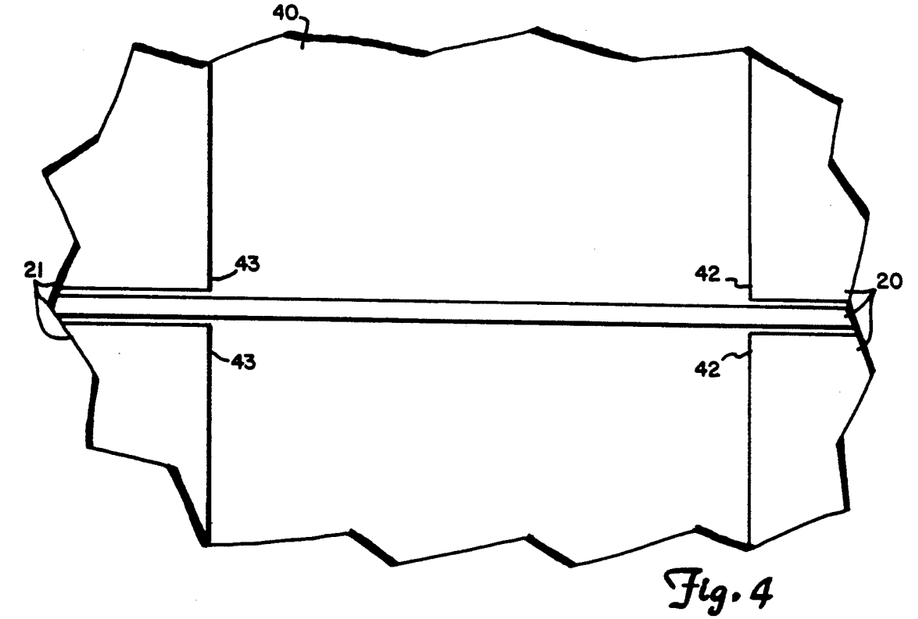
FIG. 4 shows a component for use in the present invention.

FIG. 4 shows a representation of such a LiNbO$_3$ substrate, 40, with modulators 20 and 21 formed thereon. A waveguide, 41, is formed in substrate 40 by depositing titanium thereon and diffusing it therein to have a resulting width of 5 $\mu$m at the substrate surface. An electrode pair, 42, is formed for modulator 20 using a thin layer of chromium for adherence to substrate 40 and a much thicker layer of gold to complete the electrodes with a thickness of 3000 $\mu$m. Each electrode is typically 40 $\mu$m and spaced 1.5 $\mu$m from waveguide 41. The length of each is typically 1.6 cm and spaced 50 $\mu$m from a further pair of electrodes, 43, used on modulator 21. Electrodes 43 are formed just as are electrodes 42.

However, placement of the modulator on a single side of coil 10 is not necessary, and modulators 20 and 21 could be on opposite sides of coil 10, for instance. So long as the frequency difference between the two modulators is sufficient, there will still be a net phase difference shift in the two light waves which, because of the feedback . loop, will be driven to cancel the Sagnac effect phase shift due to any rotation about the axis of coil 10.

Figure 5:
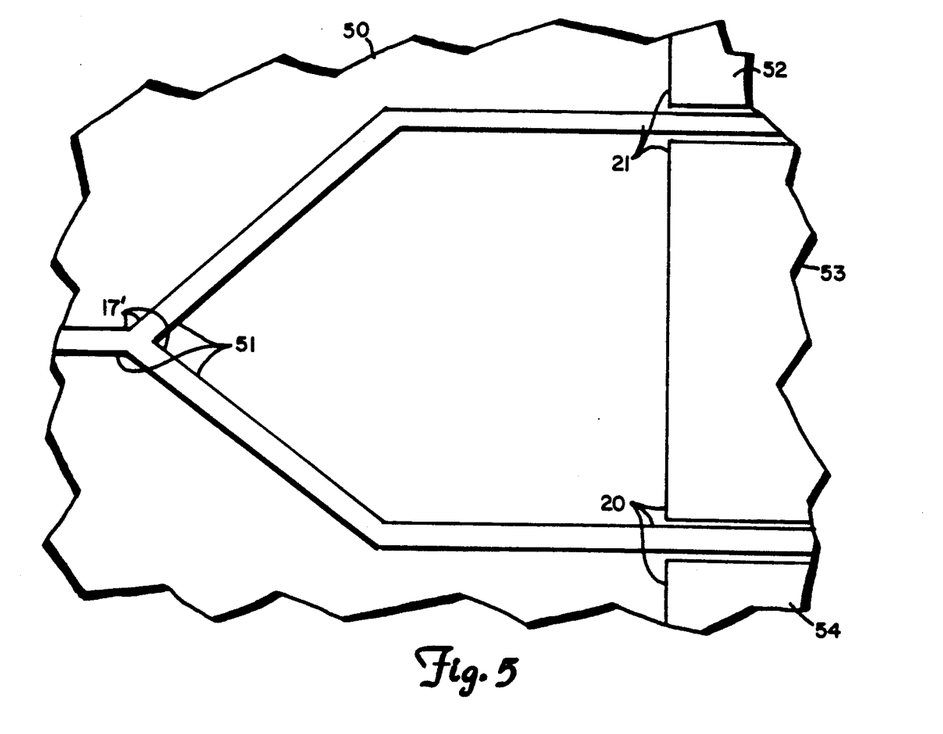
FIG. 5 shows another component for use in the present invention.

One possibility for placing modulators 20 and 21 on opposite sides of coil 10 using a LiNbO$_3$ substrate, 50, is shown in FIG. 6. Coupler 17 of FIG. 1 is substituted for by split waveguide, 51, formed again of titanium in the manner of waveguide 41. The "Y" junction in waveguide 51 performs the functions of coupler 17 and so has been designated 17' in FIG. 5. One leg of the waveguide extending from 17' passes between two electrodes, 52 and 53, to form modulator 21. The other leg passes between electrodes 53 and a further electrode, 54, to form modulator 20. Electrodes 52, 53 and 54 are formed of the materials and methods used to form the electrodes in pairs 42 and 43.

Also, bias modulator 19 could be eliminated and its modulation function could be combined with either of modulators 20 or 21. To do so, the signal from bias modulator 22 could be summed with either of the signals from generators 27 or 28 and then applied to the corresponding modulator remaining.

Since the difference in frequencies of positive serrodyne generator 27 and negative serrodyne generator 28 determine the phase difference shift provided by optical phase modulators 20 and 21 in the light waves propagating through coil 10 in opposite directions, and since an electrical feedback loop drives this phase difference shift to a value sufficient to just cancel the Sagnac effect phase difference shift due to rotation, the frequency difference between these two generators is a measure of the rotation rate. The relative values of these two frequencies indicates in which direction the rotation is occurring. Hence, the outputs of positive serrodyne generator 27 and negative serrodyne generator 28 are each brought to a frequency difference detector, 30. The difference detected then represents the output signal of the gyroscope and contains the information concerning rotation rate and rotation direction.

FIG. 3 shows an embodiment of the electrical feedback loop of FIG. 1 in somewhat greater detail with respect to positive serrodyne generator 27 and negative serrodyne generator 28. Similar items in FIGS. 1 and 3 carry the same numerical designation in each.

Each of serrodyne generators 27 and 28 are shown within dashed lines. Generator 27 has connected to its input a voltage controlled oscillator, 31, such that an increase in the output signal of integrator 26 leads to an increase in the frequency of generator 27. Generator 28 has another voltage controlled oscillator, 32, connected to its input through a polarity inverter, 32, such that an increase in the output signal of integrator 26 reduces the frequency of generator 28. The output of voltage controlled oscillator 31 of generator 27 is connected to an up digital counter, 33, at the clock input thereof. Similarly, the output of voltage controlled oscillator 32 is connected to the clock input of a down digital counter, 34. The output of up counter 33 of generator 27 is connected to a digital-to-analog converter, 35, capable of converting a six bit length digital signal. Again, the output of down counter 34 of generator 28 is connected to a digital-to-analog converter, 36, similar to converter 35. Counters 33 and 34 provide an output of six digital bits, and converters 35 and 36 accept inputs of the same number of digital bits.

The analog signal provided at the output of converter 35 is applied to an amplifier, 37, before being applied to optical phase modulator 21 which is shown in FIG. 3 in a capacitor-like connection to indicate the major component of its equivalent circuit. The same arrangement is used for generator 28 where the output of converter 36 is applied to an amplifier, 38, before being applied to optical phase modulator 20.

As indicated above, initial frequency control generator 29 provides a control signal to voltage controlled oscillators 31 and 32 so that the signal applied to optical phase modulators 21 and 20 has a frequency of typically 75.0 kHz in the steady absence of any rotation signal from photodetector system 14 and so the absence of any signal from integrator 26. A waveform of approximately that frequency is indicated below amplifier 37 for generator 27, and another such waveform below amplifier 28 for generator 28.

As can be seen in these waveforms, there are a number of small voltage increments or decrements in the long duration slope or ramp portion of each. These steps represent the voltage outputs of the digital-to-analog converters 35 and 36, after amplification, for each increasing count or decreasing count out of the corresponding counter connected to the input of a corresponding one of converters 35 and 36. Thus, a sawtooth-like waveform is provided that closely approximates a sawtooth waveform, with positive peaks for generator 27 in its corresponding waveform and negative peaks for generator 28 in its corresponding waveform, which are to be applied to phase modulators 21 and 20, respectively.

Since 64 counting steps are used to approximate the serrodyne waveform, each representing an increment or a decrement of one count at the outputs of counters 33 and 34, voltage controlled oscillators 31 and 32 will operate at frequencies which are 64 times that of the basic frequencies occurring in the waveforms applied to modulators 20 and 21. The actual frequencies of operation of voltage control oscillators 31 and 32 are set by generator 29 and integrator 26 as indicated above.

As can be seen in FIG. 3, frequency difference detector 30 is connected to the outputs of voltage controlled oscillators 31 and 32. Thus, the frequency difference detected by detector 30 will be 64 times the actual frequency difference between the waveforms applied to optical phase modulators 20 and 21. Nevertheless, the output of frequency difference detector 30 will contain the information concerning the rotation rate of the gyroscope about the axis of coil 10 and the direction of that rotation.

Although the present invention has been described with reference to preferred embodiments, workers skilled in the art will recognize that changes may be made in form and detail without departing from the spirit and scope of the invention.

What is claimed is:

1. A phase difference controller for a rotation sensor capable of sensing rotation about an axis of a coiled optical fiber based on having a pair of electromagnetic waves propagating through said optical fiber in opposing directions to both impinge on a photodetector with a phase difference relationship therebetween, said phase difference controller comprising:

a phase detector means having an input electrically connected to said photodetector to receive an output signal therefrom representative of phase differences occurring in pairs of electromagnetic waves impinging thereon, said phase detector means being capable of providing an output signal on an output thereof representative of both magnitude and direction of said phase differences indicated by said photodetector output signal;

a dual generator means having an input electrically connected to said phase detector means output to receive said phase detector means output signal, said dual output generator means having first and second outputs and being capable of providing a pair of output signals including a first output signal at said first output thereof and a second output signal at said second output thereof, said first output signal having a basic waveform portion repeated at selected frequencies consisting of a relatively long duration of substantially monotonically changing magnitude in one magnitude direction followed by a much shorter duration of substantially monotonically changing magnitude in an opposite magnitude direction, said second output signal having a basic waveform portion repeated at selected frequencies consisting of a relatively long duration of substantially monotonically changing magnitude in one magnitude direction followed by a much shorter duration of substantially monotonically changing magnitude in an opposite magnitude direction, said frequencies of said first and second output signals being determined by said phase detector means output signal with each being of a selected initial value absent any substantial rotation of said coiled optical fiber about said axis thereof, said dual output generator means first output signal having a change in frequency value in one magnitude direction for said coiled optical fiber rotating in one direction about said axis thereof and said dual output generator means second output signal having a change in frequency value in that same magnitude direction for said coiled optical fiber rotating in an opposite direction about said axis thereof so as to tend toward reducing differences in harmonics therebetween to thereby tend toward maintaining substantially constant that ratio occurring between values of an output of said rotation sensor and corresponding rates of rotation of said coiled optical fiber over both directions of rotation about said axis thereof; and a pair of frequency translation means including a first frequency translation means electrically connected to said dual output generator means first output and a second frequency translation means electrically connected to said dual output generator means second output, said first and second frequency translation means each being positioned in a corresponding optical path portion selected from among those optical path portions taken by electromagnetic waves to reach or leave said coiled optical fiber enroute on an optical path to said photodetector in said rotation sensor to be capable of providing a frequency translation of any such electromagnetic waves passing therethrough in propagating along said optical path.

2. The apparatus of claim 1 wherein there is also positioned in a said optical path portion a bias optical phase modulator capable of phase modulating any such electromagnetic waves passing therethrough in propagating along said optical path so as to provide a varying phase difference between such electromagnetic waves propagating through said coiled optical fiber in opposing directions.

3. The apparatus of claim 1 further comprising a bias modulating signal generator which provides a signal varying at a frequency to said phase detector means and a signal varying at a frequency to said dual output generator means where it is combined with a selected one of said first and second dual output generator output signals to provide a substitute output signal for that one of said first and second dual output generator output signals so combined 4. The apparatus of claim 1 wherein said dual output generator means second output signal frequency decreases from said initial value thereof if said dual output generator means first output signal frequency increases from said initial value thereof, and said dual output generator means first output signal frequency decreases from said initial value thereof if said dual output generator means second output signal frequency increases from said initial value thereof.

5. The apparatus of claim 1 wherein any of said optical path portions containing either of said pair of frequency translation means each extend to a beam-splitting means.

6. The apparatus of claim 1 wherein said pair of frequency translation means are each an optical phase modulator.

7. The apparatus of claim 1 wherein said first and second output signals are each substantially a sawtooth waveform.

8. The apparatus of claim 2 wherein said bias optical phase modulator receives a signal varying at a frequency from an output of a bias modulator signal generator, and said phase detector means also receives a signal from an output of said bias modulator signal generator also varying at a frequency.

9. The apparatus of claim 3 wherein said bias modulating signal generator provides a sinusoidal output signal, and said signal received by said dual output generator means has a frequency substantially identical to that frequency occurring in said signal received by said phase detector means.

10. The apparatus of claim 1 wherein said dual output signal generator means contains an integrating means which has an input thereof electrically connected to said dual output signal generator means input.

11. The apparatus of claim 4 wherein said dual output signal generator means contains a pair of voltage controlled oscillator means, one having an input thereof electrically connected to said dual output signal generator means input and that one remaining having an input thereof electrically connected to said dual output signal generator means input through a polarity inverter, said pair of voltage controlled oscillator means each having an output electrically connected to an input of a corresponding digital counter means, each said digital counter means having an output that is electrically connected to an input of a corresponding digital-to-analog converter, said digital-to-analog converters each having an output electrically connected to a corresponding one of said dual output signal generator means first and second outputs.

12. The apparatus of claim 5 wherein said beam-splitting means is a first optical directional coupler means having a pair of ports therein at each of those opposing ends of transmission media therein, and in having said optical path portions extending thereto, as aforesaid, has them extend to that said pair of ports at one end of said transmission media therein, said first optical directional coupler means having a first single said optical path portion extending from a port on an opposite end thereof to a port in a polarizer, said polarizer having said first single optical path portion and a second single optical path portion extending from ports on either end of transmission media contained therein, said second single optical path portion extending to a port of a second optical directional coupler similar to said first optical directional coupler with a pair of ports on either end of transmission media contained therein, there being a third single said optical path portion extending from a port on an opposite end of said second optical directional coupler to said photodetector.

13. The apparatus of claim 6 wherein said optical phase modulators are each provided in a common integrated circuit chip.

14. The apparatus of claim 8 wherein said bias modulator signal generator provides a sinusoidal output signal, and said signal received by said bias optical phase modulator has a frequency substantially identical to that frequency occurring in said signal received by said phase detector means.

15. The apparatus of claim 10 wherein said dual output signal generator means contains a pair of voltage controlled oscillator means, one having an input thereof electrically connected to an output of said integrator means and that one remaining having an input thereof electrically connected to said integrator means output through a polarity inverter, said pair of voltage controlled oscillator means each having an output electrically connected to an input of a corresponding digital counter means, each said digital counter means having an output electrically connected to an input of a corresponding digital-to-analog converter, said digital-to-analog converters each having an output electrically connected to a corresponding one of said dual output signal generator means first and second outputs.

16. The apparatus of claim 12 wherein there is a fourth single optical path portion between a port of said second optical directional coupler and a source of electromagnetic radiation.

17. The apparatus of claim 15 wherein signals at said outputs of said digital-to-analog converter change in value in opposite magnitude directions.

18. The apparatus of claim 11 wherein said dual output signal generator means contains an integrator means electrically connected between said dual output signal generator means input and said inputs of both said polarity inverter and one of said pair of voltage controlled oscillators.

19. A method for detecting rotation about an axis of a coiled optical fiber, said method comprising:
providing a pair of electromagnetic waves following an optical path in propagating through said coiled optical fiber in opposing directions to both impinge on a photodetector after passing through a pair of frequency translation means;
providing a signal representative of any phase difference between said electromagnetic waves at impingement on said photodetector;
providing a pair of frequency translation control signals, one to each said frequency translation means in said pair of frequency translation means to direct operation thereof, with that frequency translation control signal provided to one of said frequency translation means having a basic waveform portion repeated at selected frequencies consisting of a relatively long duration of substantially monotonically changing magnitude in one magnitude direction followed by a much shorter duration of substantially monotonically changing magnitude in an opposite magnitude direction, and that remaining frequency translation control signal in said pair thereof having a basic waveform portion repeated at selected frequencies consisting of a relatively long duration of substantially monotonically changing magnitude in one magnitude direction followed by a mush shorter duration of substantially monotonically changing magnitude in an opposite magnitude direction, said frequencies of said pair of frequency translation control signals having values determined by said phase difference indicating signal such that these frequencies have selected initial values absent any substantial rotation of said coiled optical fiber about said axis thereof, and such that one has a change in value in one magnitude direction for said coiled optical fiber rotating in one direction about said axis thereof with that one remaining having a change in value in that same magnitude direction for said coiled optical fiber rotating about said axis thereof in an opposite direction so as to tend toward reducing harmonic differences between said pair of frequency translation control signals to thereby tend toward maintaining substantially constant that ratio occurring between values of an output signal and corresponding rates of rotation of said coiled optical fiber over both directions of rotation about said axis thereof; and varying that phase difference occurring between said pair of electromagnetic waves by operating said frequency translation means in said optical path in accord with said frequency translation control signals to shift frequencies of said pair of electromagnetic waves.

20. The method of claim 19 wherein each of said pair of frequency translation means is an optical phase modulator.

21. The method of claim 19 wherein said providing of a signal representative of phase difference comprises having said pair of electromagnetic waves also pass through a further optical phase modulator while providing a sinusoidal signal to operate such optical phase modulator at a selected frequency.

22. The method of claim 19 wherein said providing of a signal representative of phase difference comprises providing a sinusoidal signal to be combined with one of said frequency translation control signals.

23. The method of claim 19 wherein said frequency translation control signals are each substantially a sawtooth waveform.

* * * * *

UNITED STATES PATENT AND TRADEMARK OFFICE
CERTIFICATE OF CORRECTION

PATENT NO. : 5,018,859
DATED : May 28, 1991
INVENTOR(S) : Chin L. Chang et al.

It is certified that error appears in the above-identified patent and that said Letters Patent is hereby corrected as shown below:

On the title page:
    In the References Cited section, under U.S. PATENT DOCUMENTS, insert the following:

3,952,306    4/1976    Benton . . . . . . .
    4,338,528    7/1982    Wolkstein . . . . .
    4,687,330    8/1987    LeFevre . . 356/350

In the References Cited section, under OTHER PUBLICATIONS, insert the following:

"Optical Fibre Gyroscope Using A Coherent Source," I. Giles et al, Paper for Conference: Collegium on Optical Fiber Sensors, London, England, 26 May 1982

"Electro-optic-waveguide Frequency Translator in $LiNbO_3$ Fabricated by Proton Exchange," K. Wong et al., Optics Letters, Vol. 7, No. 11, 11/1982, pp. 546-548

Signed and Sealed this

Third Day of November, 1992

Attest:

DOUGLAS B. COMER

*Attesting Officer*      Acting Commissioner of Patents and Trademarks